United States Patent
Bulthuis et al.

(10) Patent No.: US 6,289,147 B1
(45) Date of Patent: Sep. 11, 2001

(54) PASSBAND FLATTENING OF A PHASAR

(75) Inventors: Hindrick Freerk Bulthuis; Martin Ronald Amersfoort, both of Enschede (NL)

(73) Assignee: BBV Design BV (NL)

( * ) Notice: Subject to any disclaimer, the term of this patent is extended or adjusted under 35 U.S.C. 154(b) by 0 days.

(21) Appl. No.: 09/430,836

(22) Filed: Nov. 1, 1999

(51) Int. Cl.$^7$ ...................................................... G02B 6/28

(52) U.S. Cl. ................................ 385/24; 385/14; 385/46; 385/43

(58) Field of Search ................................ 385/46, 24, 14, 385/43

(56) References Cited

U.S. PATENT DOCUMENTS

| | | | |
|---|---|---|---|
| 4,773,063 | 9/1988 | Hunsperger et al. | 370/3 |
| 5,002,350 | 3/1991 | Dragone | 350/96.15 |
| 5,412,744 | 5/1995 | Dragone | 385/24 |
| 5,488,680 | 1/1996 | Dragone | 385/24 |
| 5,629,992 | 5/1997 | Amersfoort et al | 385/15 |
| 5,706,377 | 1/1998 | Li | 385/37 |
| 5,745,612 * | 4/1998 | Wang et al. | |
| 5,748,811 | 5/1998 | Amersfoort et al. | 385/15 |
| 5,889,906 | 3/1999 | Chen | 385/28 |
| 5,926,298 * | 7/1999 | Li | |
| 5,962,298 | 7/1999 | Li | 359/120 |
| 6,181,849 * | 1/2001 | Lin et al. | |

FOREIGN PATENT DOCUMENTS

| | | |
|---|---|---|
| 0 721 120 A1 | 7/1996 | (EP) . |
| 0 881 512 A2 | 12/1998 | (EP) . |
| 0 933 664 A2 | 8/1999 | (EP) . |
| 9-297228 | 11/1997 | (JP) . |

OTHER PUBLICATIONS

Thompson et al., "An original low–loss and pass–band flattened SiO$_2$ on Si planar wavelength demultiplexer," *OFC '98 Technical Digest*, Optical Fiber Conference, 1988, Feb. 22–27, San Jose, California, p. 77.

Okamoto et al., "Eight–channel flat spectral response arrayed–waveguide multiplexer with asymmetrical machzehnder filters, " *IEEE Photonics Technology Letters*, vol. 8, no. 3, Mar. 1996, pp. 373–374.

Dragone, "Efficent techniques for widening the passband of a wavelength router"*Journal of Lightwave Technology*vol. 16, no. Oct. 1998, pp. 1895–1906.

* cited by examiner

Primary Examiner—Hung N. Ngo
(74) Attorney, Agent, or Firm—Charles S. Guenzer (57) ABSTRACT

A passband-flattened phasar including two free space regions coupled by a plurality of waveguides having predetermined differences between their lengths so as to act as an arrayed waveguide grating. The phasar is particularly useful in a wavelength-division multiplexed (WDM) optical communication system transmitting multiple wavelength systems arranged in a wavelength comb with a constant wavelength channel spacing. The input waveguide is coupled to the first free space region through a Mach-Zehnder interferometer (MZI) having two waveguide arms of differing lengths receiving approximately equal amounts of the input signal. The arms differ in lengths so as to produce a phase difference between them. In a WDM network, the waveguide arm produce a phase difference such that the free spectral range of the MZI equals the wavelength channel spacing, such that the wavelength response of the MZI is the same for each of the WDM wavelengths. The two outputs of the MZI are coupled into the input end of a multi-mode interferometer (MMI) with a lateral separation which provides a lateral spatial dispersion in the MMI equaling the lateral spatial dispersion of the conventional phasar. Thereby, a larger portion of the passband is equally passed through the phasar.

19 Claims, 8 Drawing Sheets

However each of the distributed elements must provide
PASSBAND FLATTENING OF A PHASAR

FIELD OF THE INVENTION

The invention relates optical communications networks. In particular, the invention relates to an arrayed waveguide demultiplexing/switching element.

BACKGROUND ART

Optical wavelength-division multiplexing (WDM) elements are becoming increasingly important in advanced optical communications networks incorporating optical fiber transmission paths. Silica optical fiber has a transmission bandwidth of over 300 terahertz per second. Such an extremely large bandwidth is, however, limited by the electronics on the transmitting and receiving ends. Such electronic transmitters and receivers, typically bases on silicon electronics, are limited commercially at the present time to 2 to 10 gigabits/s (Gbs). Further increases to 40 Gbs are contemplated, but further increases will be difficult to achieved.

Figure 1:
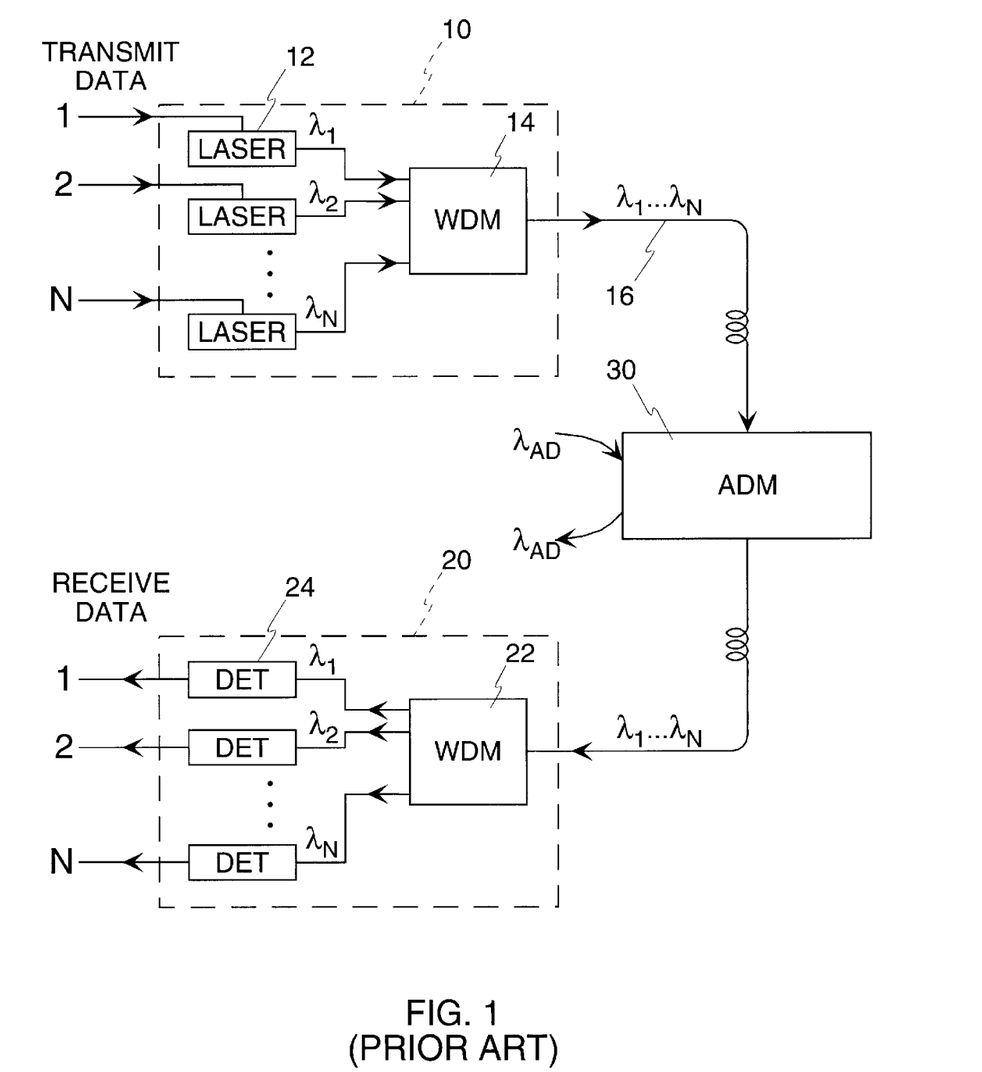
FIG. 1 is a schematic diagram of a wavelength-division multiplexing (WDM) optical fiber communication system.

For these reasons, WDM has been proposed in which multiple (N) electronic data channels, as illustrated in FIG. 1, enter a transmitter 10 and modulate separate optical emitters such as lasers 12 having N respective output carrier wavelengths $\lambda_1, \lambda_2, \ldots \lambda_N$. Conveniently, these wavelengths are arranged in a WDM wavelength comb having the neighboring wavelengths $\lambda_1, \lambda_2, \ldots \lambda_N$ separated by a substantially constant inter-channel spacing given by $$\Delta\lambda_S = \lambda_{i+1} - \lambda_i. \quad (1)$$

An optical wavelength-division multiplexer 14 combines the optical signals of different wavelengths and outputs the combined signal on a single optical fiber 16. An optical receiver 20 includes a wavelength-division demultiplexer 22 which divides its received signals according to their optical wavelength to N optical detectors 24 according to the same wavelength allocation $\lambda_1, \lambda_2, \ldots \lambda_N$. In view of usually experienced reciprocity in passive systems, a wavelength-division demultiplexer is usually substantially identical to a wavelength-division multiplexer with a reversal of their inputs and outputs.

Additionally, an optical add/drop multiplexer (ADM) 30 may be interposed on the optical path 16 between the transmitter and the receiver 20. The optical add/drop circuit 30 removes from the optical channel on the fiber 16 one or more wavelength channels at wavelength $\lambda_{AD}$ and inserts back onto the fiber 16 an optical data signal perhaps containing different information but at the same optical carrier wavelength $\lambda_{AD}$. The ADM 30 is typically implemented with technology closely resembling the WDMs 14, 22. All-optical networks have been proposed in which a distributed networks having many nodes each including a transmitter 10 and receiver 20 are linked by a functionally passive network which routes the signals between the nodes according to their wavelengths. The routing elements in such an all-optical network require switching elements similar to the ADM 30.

In order to maximize the transmission capacity of the optical fiber 16, the wavelength channels $\lambda_1, \lambda_2, \ldots \lambda_N$ should be placed as closely together as possible with a minimum channel spacing $\Delta\lambda_S$. In advanced systems, this inter-channel spacing $\Delta\lambda_S$ is 1 nm or less for a signal centered around 1300 or 1550 nm, the preferred bands for silica fiber. Such closely spaced WDM networks are referred to as dense WDM networks (DWDM).

The network design described above may be subject to a problem arising from the fact that the operation of the transmitter 10, receiver 20 and intermediate node 30 are all referenced to the same set of WDM wavelengths $\lambda_1, \lambda_2, \ldots \lambda_N$. However each of the distributed elements must provide its own wavelength calibration. Due to environmental and aging effects, the wavelength calibration settings at one element are likely to differ from those at another element. In view of the close spacing of the optical channels, any miscalibration between network elements is likely to produce inter-channel interference.

For an optimized optical system, the fiber 16, the WDMs 14, 22, and the ADM 30 are typically designed to be single-mode at least at their ports for the optical wavelengths being used. Although each of the lasers 12 is likely emitting light across an exceedingly narrow bandwidth, the single-mode response of the frequency sensitive elements 14, 22, 30 usually has a wavelength (frequency) characteristic that approximates a gaussian distribution about the center wavelength $\lambda_0$ of the channel $F(\lambda) = \exp(-(\lambda-\lambda_0)^2/\Delta\lambda_G^2)$. The value of the gaussian passband $\Delta\lambda_G$ can be fairly freely chosen for present day fabrication techniques. However, the value of the passband is subject to countervailing restraints. For dense WDM systems, the inter-channel spacing $\Delta\lambda_S$ is made as small as possible. The gaussian passband $\Delta\lambda_G$ must be substantially smaller than the inter-channel spacing $\Delta\lambda_S$ to avoid interference between channels. On the other hand, the frequency characteristics of the lasers 12 and other frequency-sensitive elements are subject to permanent or temporary variations. If the passband $\Delta\lambda_G$ is made too small, the peak is very narrow and small variations in wavelength away from the peak's wavelength $\lambda_0$ causes operation to shift to the sides of the peak, thereby degrading the signal strength. That is, for a strong signal the passband $\Delta\lambda_G$ should be made as large as possible to provide a broad top of the peak.

Amersfoort et al. have already recognized these problems, as disclosed in U.S. Pat. No. 5,629,992. These patents describe arrayed waveguide gratings, also called phasars, of the sort described by Hunsperger et al. in U.S. Pat. No. 4,773,063, and by Dragone in U.S. Pat. Nos. 5,412,744 and 5,488,680. In particular Amersfoort et al. describe a WDM phasar 40 exemplified in the schematic illustration of FIG. 2. A single-mode waveguide 42 is coupled to one end of a multi-mode waveguide 44 of length chosen to produce a doubled image of the radiation from the single-mode waveguide 42 at a port 46 on one side wall 47 of a first free space region 48. The multi-mode waveguide 44 acts as a multi-mode interferometer (MMI). Multiple single-mode array waveguides 50 are coupled to ports on the other side of the first free space region 48 in the form of a star coupler. The array waveguides 50 are coupled on the other end to one side of a second free space region 52. The array waveguides 50 have lengths with predetermined length differences between them to act as an arrayed waveguide grating (AWG), operating similarly to a planar diffraction grating. Single-mode output waveguides 54 are coupled to the other side of the second free space region 50 along an output wall 56. The AWG causes the multi-wavelength signal from the input waveguide 42 to be wavelength demultiplexed on the respective output waveguides 54. Because of the reciprocal nature of the device, the roles of input and output can be reversed so that the same structure can be used as a wavelength multiplexer and as a wavelength demultiplexer. The placement and number of waveguides contemplated by Amersfoort et al. are wider than the example of a single input presented below.

Figure 2:
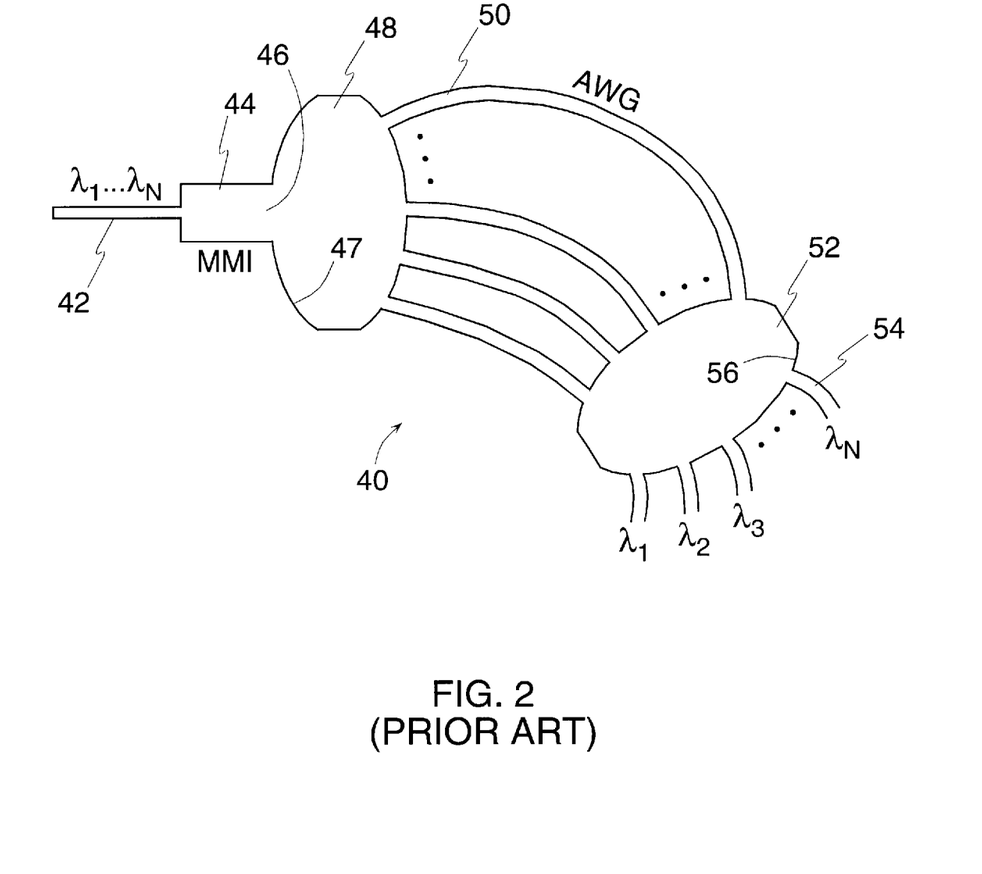
FIG. 2 is a schematic illustration of a prior art design for broadening the passband in a phasar by the use of a multi-mode interference filter.

The gaussian wavelength distribution described above for single-mode elements is related to the gaussian spatial distribution of intensity experienced at the outputs of single-mode fibers. However, the multi-mode waveguide 44, because it typically contains two closely spaced peaks at the port 46, produces a spatial output pattern into the first free space region 48 that is not gaussian but is much flatter at its peak than a corresponding gaussian distribution of the same passband. The wavelength characteristic of the free space between the multi-mode waveguide 44 and the rest of the phasar 40 is therefore also flattened. As a result, with the use of the multi-mode interference filter 44, it is possible to obtain a narrow wavelength response for the phasar but with smaller variations in response for small wavelength variations about the central values. However, the MMI solution of Amersfoort et al. suffers a power penalty of 2 to 3 dB as the single-mode power is spread out over a wider area. Chen discloses a somewhat similar approach in U.S. Pat. No. 5,889,906, wherein he uses multi-mode sections, not in order to flatten the bandpass of the individual channels as Amersfoort et al. did, but in order to obtain better uniformity for the different individual channels.

Dragone in U.S. Pat. No. 5,412,744 broadens the passband of a standard phasar by having a Y-coupler interposed between the single-mode input waveguide 42 and two single-mode waveguides separately coupled into the free space region 48. The result is to spread the intensity for one mode across a larger area on the input wall of the free space region 48. This approach suffers a similar power penalty of 2 to 3 dB.

Dragone in U.S. Pat. No. 5,488,680 suggests the advantage of cascading wavelength routing devices such as phasars. One configuration he develops includes a Mach-Zehnder interferometer (MZI), a 3 dB cross coupler between the two output waveguides of the MZI, and a standard phasar having a first free space region receiving the two waveguides from the MZI on its input wall. The geometry is such that one output waveguide focuses radiation of one wavelength at the output of the phasar and the other output waveguide radiation of another wavelength there with about 0.9 dB ripple for wavelengths in between. Thereby, the passband of the combination of the Mach-Zehnder and the phasar is flattened.

Thompson et al. disclose an alternative technique for passband flattening of a phasar in "An original low-loss and pass-band flattened $SiO_2$ on Si planar wavelength demultiplexer," OFC '98 *Technical Digest, Optical Fiber Conference*, Feb. 22–27, 1988, San Jose, Calif., p. 77. Two phasars are arranged in series. The first phasar has a free spectral range equal to the channel spacing. The free spectral range is the frequency range over which the frequency characteristics are repeated. In most one-stage phasar designs, all N channel spacings fit within one free spectral range. While the Thompson design theoretically offers a lossless broadening, in practice phasars are difficult to build to achieve optimum performance.

Accordingly, it is desired to provide a phasar design which offers passband flattening with low loss in a simple design.

SUMMARY OF THE INVENTION

The invention involves a phasar which is an optical coupler, such as a wavelength multiplexer or demultiplexer, which includes an arrayed waveguide grating between two free space regions, particularly applicable to a wavelength-division multiplexing (WDM) communication system transmitting a plurality of wavelength-differentiated signals separated by a wavelength channel spacing. A Mach-Zehnder interferometer (MZI) receives an optical input signal, divides it into two parts, and passes the parts through waveguides of differing lengths, thereby introducing a phase difference between the two parts dependent upon the wavelength. The MZI is designed with a spectral free range equal to the channel spacing so that the MZI presents the same optical characteristics for each of the WDM signals. The two parts of the MZI signal are input to a multi-mode interferometer (MMI) outputting to a first free space region. The MMI preferably has a length which is a half integral of the beat length of the two lowest order modes such that the lateral position of maximum intensity at the interface between the MMI and the free space region depends upon the phase difference of the signals from the MZI. The MZI inputs are laterally spaced on one side of the MMI so that the signal output from the MMI to the free space region has a lateral spatial optical dispersion matching the wall optical dispersion of the phasar. Thereby, the transmission characteristics of the phasar are flattened for each of the passbands of the phasar. Alternatively, such an arrangement can be disposed on the output side.

DETAILED DESCRIPTION OF THE PREFERRED EMBODIMENTS

Figure 3:
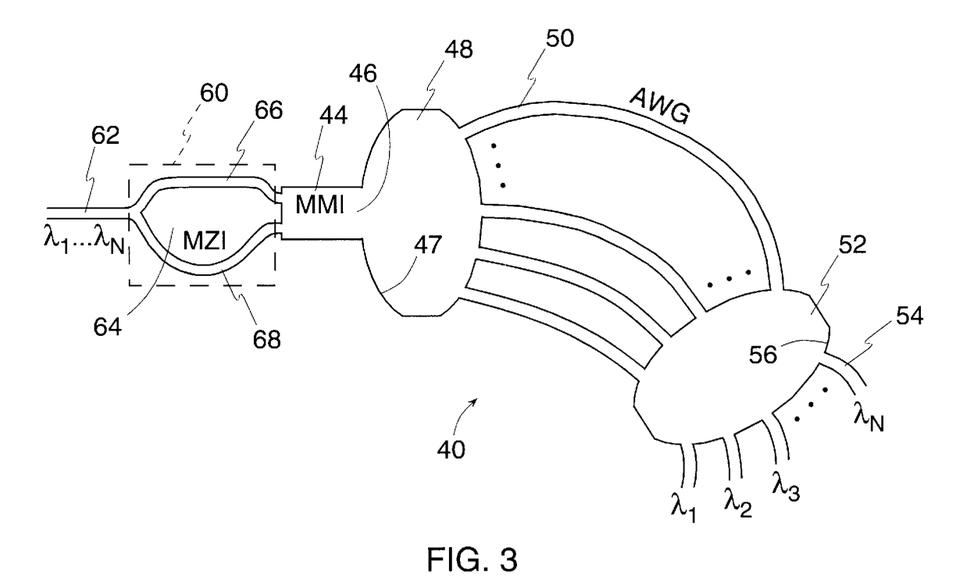
FIG. 3 is a schematic illustration of an embodiment of a passband-broadened phasar of the present invention.

One embodiment of the invention is schematically illustrated in the optical circuit of FIG. 3. The portion of the optical circuit close to the multi-mode interferometer 44 is shown in more detail in the exploded view of FIG. 4. The optical circuit includes a Mach-Zehnder interferometer (MZI) 60 which produces a linear dispersion of a distributed wavelength signal that balances the dispersion of the phasar 40 around the wavelength of the center channel of the multi-wavelength signal $\lambda_1, \lambda_2, \ldots \lambda_N$. The Mach-Zehnder interferometer 60 receives the multi-wavelength signal on a single-mode fiber 62 or other optical waveguide. A Y-coupler 64 or other type of 50:50 optical power splitter divides the signal to two single-mode waveguide arms 66, 68 of the MZI 60, preferably with equal intensities. The two arms 66, 68 have different physical lengths differing by $\Delta L$ so that a phase difference $\Delta\phi$ arises between signals of equal wavelength $\lambda_i$ as they traverse the MZI 60. However, the phase difference depends upon the value of the wavelength, as given by Equation (1)

$$\Delta\phi = 2\pi\Delta L \frac{n_{eff}(\lambda_i)}{\lambda_i} \quad (2)$$

where $n_{eff}(\lambda_c)$ is the effective optical index of the two waveguides 66, 68 at the central wavelength $\lambda_c$ of the WDM comb. It is assumed that the waveguides are of similar construction. However, an inspection of Equation (2) shows that the more relevant length is the optical length including the refractive index rather than the physical length. Techniques are well know for dynamically varying the refractive index in a waveguide by an electronic signal, for example, by a thermo-optic, electro-optic or piezo-electric effect, as described by Nishihara et al. in *Optical Integrated Circuits*, (McGraw-Hill, 1985, ISBN 0-07-046092-2). The MZI may be designed to operate in a higher order mode in which there are extra multiples of $2\pi$ in the phase difference. The order is given by $$m = \Delta L \frac{n_{eff}(\lambda_C)}{\lambda_C}\left(1 - \frac{\lambda_C}{n_{eff}(\lambda_C)}\frac{dn_{eff}(\lambda_C)}{d\lambda}\right) \quad (3)$$

The free spectral range $\Delta\lambda_{FSR}$ of an optical device is the wavelength difference over which the spectral characteristics repeat, generally corresponding to the next higher multiple of the optical wavelength. At higher orders, the free spectral range becomes increasingly narrow. For the MZI 60 operating in a high-order mode, the free spectral range is given by $$\Delta\lambda_{FSR} = \frac{\lambda_C}{m}. \quad (4)$$

According to one aspect of the invention, the free spectral range $\Delta\lambda_{FSR}$ is made approximately equal to the inter-channel spacing $\Delta\lambda_S$ with the result that the MZI 60 is designed to operate in the high order mode given by The equality need not be exact but $\Delta\lambda_{FSR}$ should be accurate within 0.25/N of the channel spacing $\Delta\lambda_S$, where N is the number of output channels For a channel spacing below 1 nm for infrared radiation of 1300 to 1550 nm, the order m is above 1000. The result of such a design is that the spectral response of the MZI 60 is the same for each of the WDM wavelengths $\lambda_1, \lambda_2, \ldots \lambda_N$ although there may be significant variations for small wavelength variations about the central values of the WDM wavelengths. The waveguide arms 64, 68 operating with the free spectral range equal to the channel spacing are preferably designed such that signals precisely calibrated to each of the N WDM wavelengths $\lambda_1, \lambda_2, \ldots \lambda_N$ traverse the MZI 60 with zero phase difference $\Delta\phi$. When the number N of output-channels of the phasar is even, the design may be such that a 180° phase difference between the two arms 64, 68 is required The MZI waveguides 64, 64 have ends that approach each other as they near the MMI 44. However, their close approach does not extend over an appreciable distance, and the free space interaction length is much less the 3 dB coupling length promoted by Dragone. As a result, the wavelength components enter the MMI 44 with equal intensity but with a phase difference varying with wavelength. Any unintended coupling during close approach can be partly eliminated by a slight reduction of the length of the MMI section 44.

Figure 4:
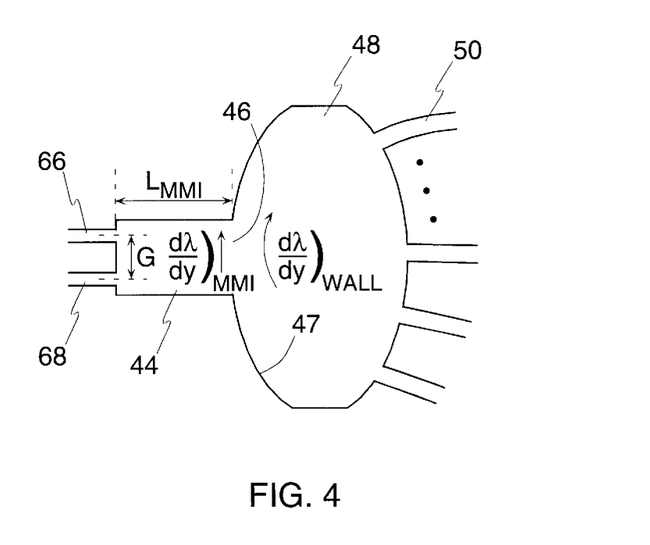
FIG. 4 is an exploded view of a portion of FIG. 3.
Figure 5A:
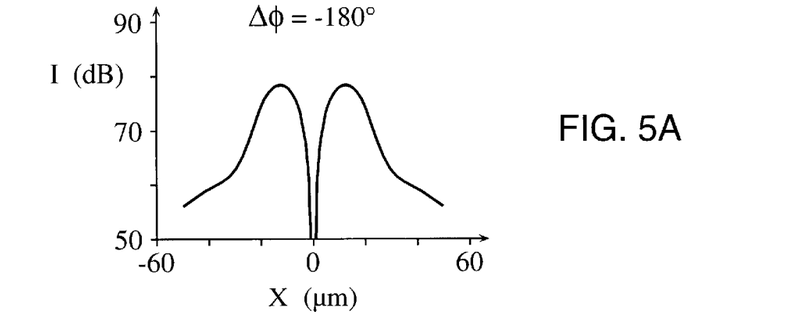
FIGS. 5A through 5H are graphs showing the lateral displacement of an intensity peak at the output plane of the multi-mode interferometer as a function of the phase difference of the signals input to the multi-mode interferometer.
Figure 5B:
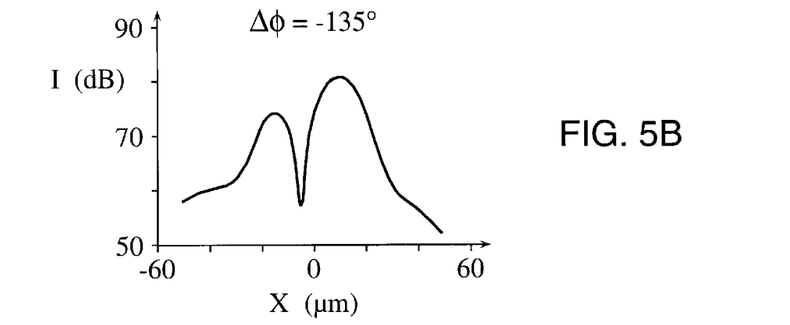
Figure 5C:
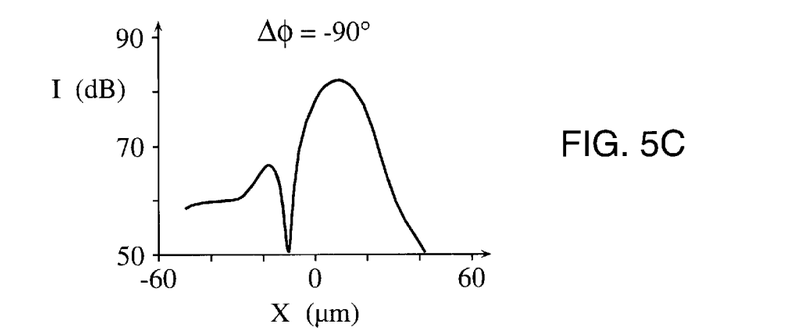
Figure 5D:
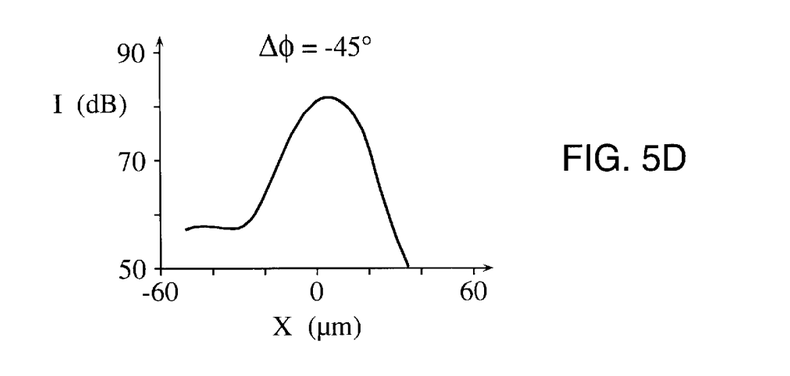
Figure 5E:
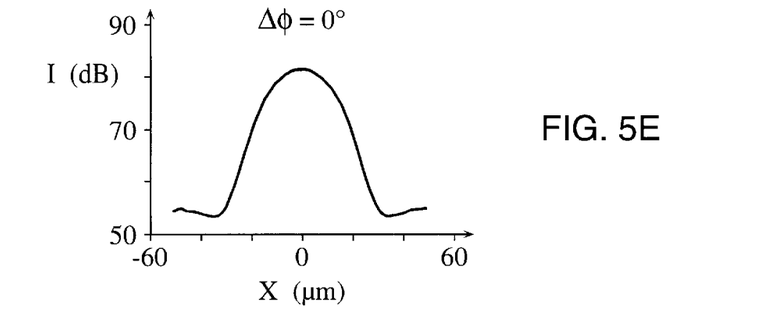
Figure 5F:
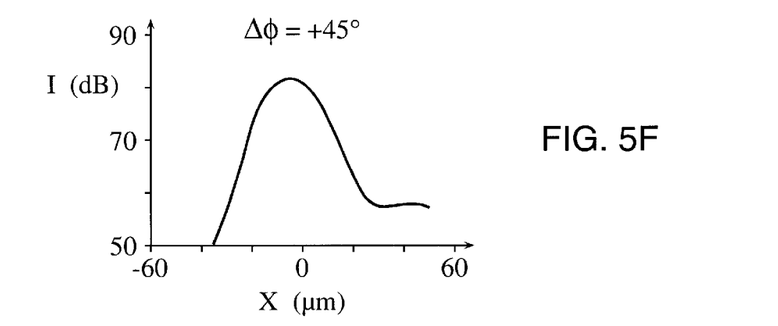
Figure 5G:
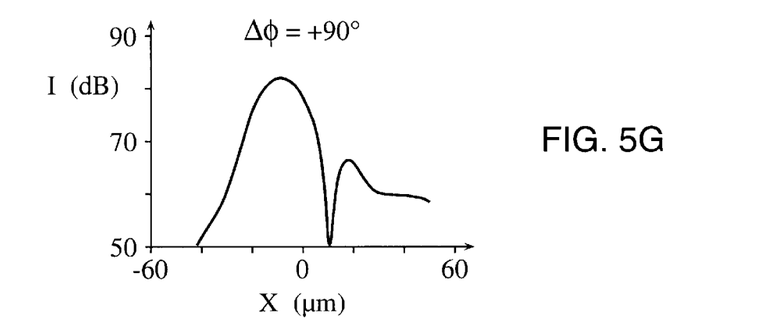
Figure 5H:
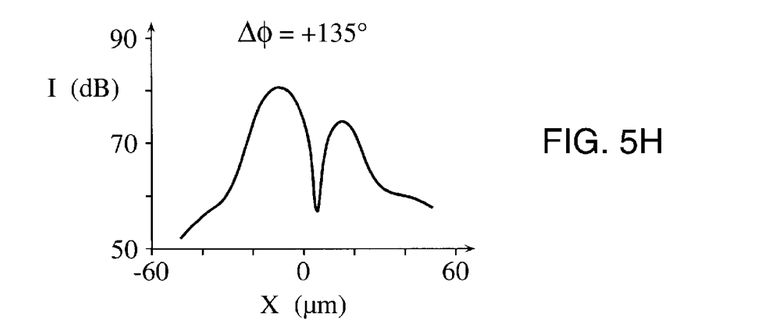

As shown best in FIG. 4, the two waveguide arms 66,68 are separately coupled into the multi-mode interference interferometer (MMI) 44 with a gap between them on one longitudinal end of the MMI 44. The gap is preferably measured by a separation G between the centers of the MZI waveguide 66, 68 as they enter the MMI 44. The MZI waveguides 66, 68 have ends that approach each other as they near the MMI 44. However, their close approach does not extend over an appreciable distance, and the interaction length is much less the 3 dB coupling length promoted by Dragone. Although the MZI 60 and MMI 44 are closely coupled without a clear interface between them, it can be considered that the signals at a given wavelength propagating on the two MZI waveguides 66, 68 enter the MMI 44 with equal intensity but with a phase difference varying with wavelength of the two signals.

The length $L_{MMI}$ of the MMI 44 is chosen to be approximately half the beat length $L_\pi$ between the two lowest order modes, that is, $$L_{MMI} = \frac{L_\pi}{2}, \quad (6)$$

where the beat length is represented by $$L_\pi = \frac{\lambda_C}{2(n_0 - n_1)} \approx \frac{4n_C W}{3\lambda_C}, \quad (7)$$

where $n_0$ and $n_1$ are the effective optical indices for the fundamental and next higher-order modes supported in the MMI 44. The 2-D engineering approximation for the beat length on the right side of Equation (7) depends upon W, which is the width of the MMI-section, and $n_C$, which is the effective index of the core region of the waveguide. It is assumed that only two non-degenerate modes are supported, but the invention is not so limited. A wide MMI supports many modes and results in nearly perfect imaging using either paired or general interference, as is described by Soldano et al. in "Optical multi-mode interference devices based on self-imaging principles and applications", *IEEE Journal Lightwave Technology*, vol . 13, no. 4, pp. 615–627, 1995. However perfect imaging is not particularly desired in the present invention. Instead, it is desired to achieve linear dispersion of a gaussian peak and low crosstalk, which is better realized with smaller MMI sections supporting only two lateral modes, and consequently introducing some excess loss of approximately 0.3 dB.

For the preferred technology of silica on silicon, with Ge-doped silica waveguides with core-to-cladding index-difference of 0.0075 and 7 $\mu$m×7 $\mu$m cores, the beat length $L_\pi$ equals approximately 750 $\mu$m and thus $L_{MMI}$ approximately equals 350 $\mu$m including some reduction approximately accounting for the waveguide cross coupling, where the MMI width is taken to be approximately 20 $\mu$m. It is possible that the MMI length be increased by multiples of the beat length so that acceptable lengths are approximately 1/2, 3/2, 5/2, etc. of the beat length, but it must be remembered that the addition of a beat length to the length of the MMI changes the sign of the dispersion.

The optical signals from the two inputs to the MMI 44 can be considered to propagate independently. However, the two radiation signals interfere according to the phase difference between them. At half the beat length, the intensity distribution at the port 46 between the MMI 44 and the first free space region 48 has a spatial dispersion across the port 46 that varies almost linearly with the phase difference $\Delta\phi$ for a restricted range of phase differences, for example, between $-90°$ and $90°$.

A calculation has been performed based upon an MMI having a width $W_{MMI}$ of 20 μm and a half-beat length of 350 μm compared to a single-mode waveguide width of 7 μm and where the separation G between the input waveguides is 10 μm. The optical intensity I measured in dB was calculated over a width of ±60 μm from the center of the MMI for phase differences Δϕ over the range of −180° to +135°. The results are graphed in FIGS. 5A through 5H. Considering only FIGS. 5C through 5G, the position of the intensity peak varied over about 10 μm as the phase difference Δϕ varied between −90° and 90°. Furthermore, the peak position varies approximately linearly with the phase difference. Because the phase difference varies with the wavelength, as is evident from Equation (2), the variation in peak position may be represented by a lateral MMI dispersion $d\lambda/dy)_{MMI}$, the sign of which depends on whether the upper or lower branch 66, 68 of the MZI 60 is longer, resulting in a positive or negative sign respectively.

In very general terms for a simple embodiment of the invention, the MMI 44 supports a fundamental mode with one lateral peak in the center of the MMI output plane 46 and a first harmonic mode that has two lateral peaks at that position. The two MZI waveguides 66, 68 are approximately aligned with respective ones of the two hannonic peaks. At the half-beat length, a zero phase difference produces a strong fundamental peak with small harmonic peaks; at positive or negative phase differences, one or the other of the harmonic peaks dominate more, and the center of the peak has a lateral displacement with respect to the center.

For phase differences of magnitude greater than approximately 90°, the linear relation between lateral position and wavelength breaks down. These large phase differences correspond to wavelengths between the WDM comb. The precise value of the onset of the non-correspondence between position and wavelength is not crucial to the operation of the invention.

As shown in the exploded schematic view of FIG. 3, the phasar 40 is designed so that the first free space region 48 has a spatial dispersion $d\lambda/dy)_{WALL}$ along the wall including the port 46 between the MMI 44 and the first free space region 48. If hypothetical waveguides carrying signals of distinctive wavelengths were coupled into the first free space region 48 at locations corresponding to wavelengths calculated to include the spatial dispersion $d\lambda/dy)_{WALL}$, all the different wavelengths would be focused at a single spot on the output wall 56 of the second free space region 52 of FIG. 3. Another way of viewing the optical dispersion is to consider a multi-wavelength signal entering the first free space region at a fixed position on its wall 47 and determining the wavelength dispersion of that signal on the output wall 56 of the second free space region 52. The lateral dispersion of the MMI 44 is designed to compensate for the wavelength dispersion on the output wall 56 so that a broadened passband is presented to a single point on the output wall 56. Assuming that the phasar 40 is designed to have generally symmetric input and output geometries, the spatial dispersion is what enables a multi-wavelength signal input on the waveguide 42 to be wavelength demultiplexed into the output waveguides 54, and similarly for multiplexing in the opposite direction, but this separation is between different wavelengths of the WDM comb. The compensation of the invention is useful when limited to a limited passband of the separate wavelengths.

According to the invention, the phasar and MMI are designed such that the phasar spatial dispersion and the MMI lateral dispersion are equal $$\left(\left(\frac{d\lambda}{dy}\right)\right)_{MMI} = \left.\frac{d\lambda}{dy}\right)_{WALL}. \tag{7}$$

Of course, it is important that the sign of the dispersion of the MMI and the phasar are the same at the wall 46. The sign of the dispersion of the phasar $d\lambda/dy)_{WALL}$ depends on whether the length increments of the branches 50 is positive or negative. An implementation where the dispersion is of correct sign is shown in FIG. 3. It is further appreciated that the equality need not be exact and a 25% variation between the two would still produce an advantageous result. Because of the equality of the inter-channel spacing and the spectral free range, the MMI lateral dispersion can be represented by $$\frac{\Delta\lambda_S}{2G} = \left.\frac{d\lambda}{dy}\right)_{WALL}. \tag{8}$$

That is, half a channel spacing is spread across the separation between the MZI waveguides at their interface to the MMI. In the usual symmetric phasar design, the spatial dispersion is equal on the input and output walls. If the waveguide spacing on the output wall is d, then the input waveguide separation G should be approximately half this value. For a more conservative design utilizing less than half of the inter-channel phase spacing, G may be somewhat less than half of d, for example, 0.4, while still maintaining equality of the two spatial dispersions.

As mentioned above, each of the precise WDM wavelengths $\lambda_1, \lambda_2, \ldots \lambda_N$ should enter the MMI 44 with zero phase difference Δϕ (or 180° for even values of N), and thus each will have a peak laterally positioned in the middle of port 56 between the free space region 48 and the MMI 44 of half beat length. All these precisely registered signals will be demultiplexed according to wavelength to the corresponding output waveguide 54 of FIG. 3. Furthermore, because of the matching of dispersion, signals entering the MMI 44 from the MZI 60 with phase differences Δϕ between ±90° will also be accurately conveyed across the phasar to be demultiplexed on the proper output waveguide 54. This phase window of 180° corresponds to half the channel spacing $\Delta\lambda_S$. The result is a spectral response that is approximately flat for half the channel spacing and thus much flatter than the typical gaussian response exhibited by phasars.

Figure 6:
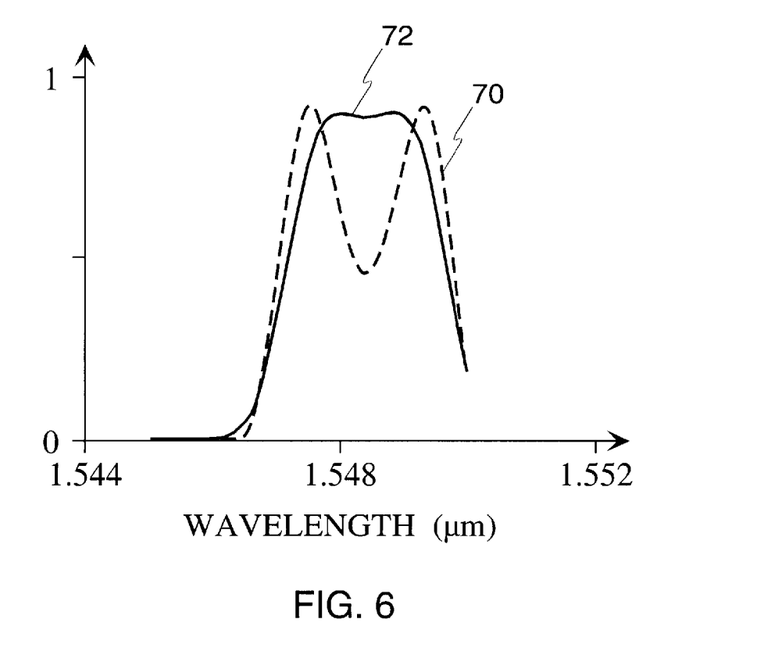
FIGS. 6 and 7 contain graphs illustrating the passband flattening achievable with the invention and compared to the prior art.
Figure 7:
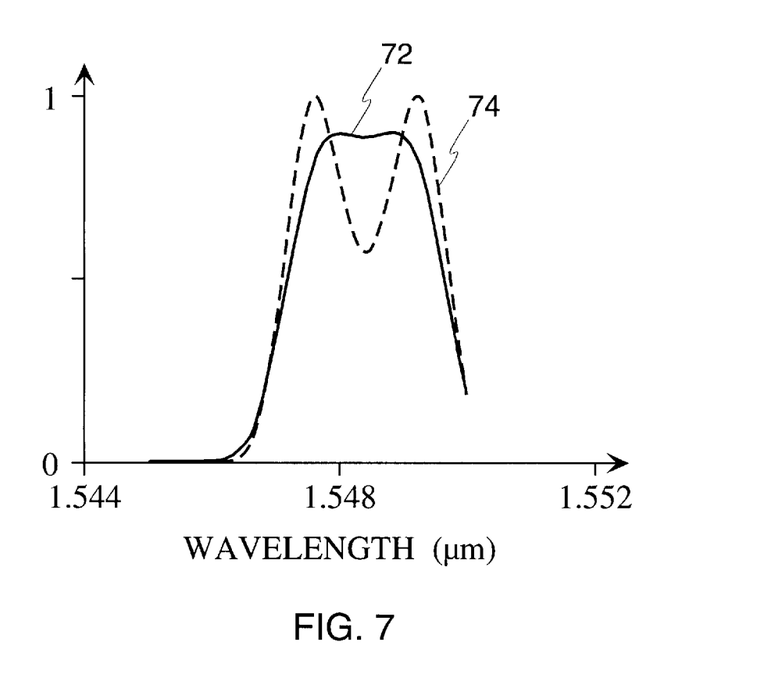
Figure 8:
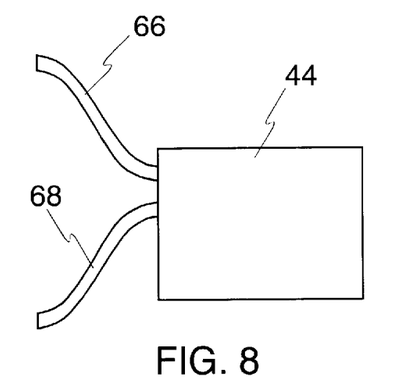
FIGS. 8 through 13 are schematic illustrations of alternative embodiments of the invention.

An example of the passband flattening achievable with the invention is presented in the graphs of FIG. 6, which are based upon calculations. When the MMI is designed with a large width of 30tm and the waveguide separations G is 10 μm, the spectral response of the phasar is represented by the double-peaked curve 70 of FIG. 6. A far better spectral response is obtained when the MMI is designed with a width of 18.5 μm with the same gap G of 10 μm so that the MMI supports only two modes. The resulting spectral response is represented by the flattened curve 72. This response should be compared to the response represented by a double-peak curve 74, shown in FIG. 7, for the Dragone phasar using a 3 dB coupler between the MZI outputs rather than an MMI. Each of the two peaks corresponds to the generally gaussian response of the Dragone phasar. The peaks of Dragone are doubled because the MZI introduces the signals at two different spots along phasar wall. If the MZI were not used, the spectral response would correspond to one of the peaks.

The phasar represented in FIG. 3 is a linear, reciprocal device. Accordingly, it can be operated either as a demultiplexer as described or a multiplexer in which different wavelength signals are separately input on the respective corresponding waveguides 54 and a single wavelength multiplexed signal is output on the waveguide 62. By a similar extension, respective MZIs and MMIs can be placed on each of the N output waveguides rather than a single pair on the one input waveguide. Also, it is well known that a demultiplexer such as that illustrated in FIG. 3 can be generalized to an optical splitter having more than one input waveguide 62. In this case, each of the input waveguides has its own MZI and MMI, with the MMIs positioned at precisely chosen locations on the input wall of the first free space region.

The geometry of the interface between the MZI 60 and MMI 44 illustrated in FIG. 3 is intended to be only suggestive. It is preferred that adjacent the MMI 44, the two MZI waveguides 66, 68 symmetrically approach the MMI 44 from different lateral sides with equally curving paths.

Figure 9:
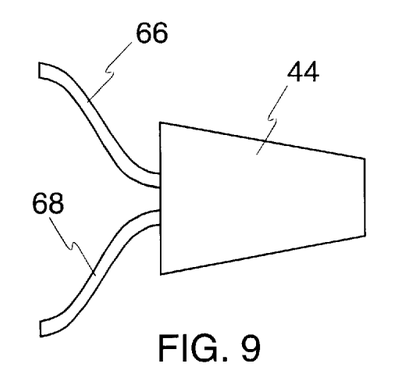
Figure 10:
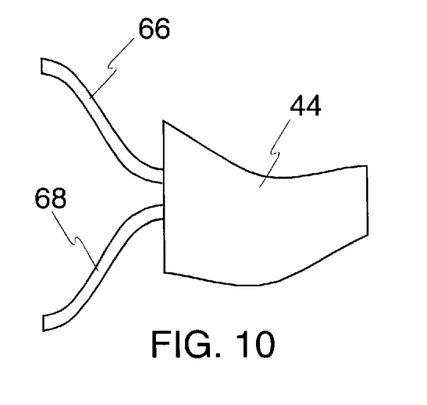

The designs and calculations presented above have assumed a simple geometry of a rectangular MMI joined directly to symmetrically placed MZI waveguides. Other designs are represented in FIG. 8 through 13. An FIG. 8, the MZI waveguides 66, 68 are asymmetrically placed on the input side of the MMI 44. In FIG. 9, the MMI 44 is tapered. As a result, the radiation field input from the MZI waveguides 66, 68 is compressed to the output side. The MMI lateral dispersion then needs to be determined at the output side, not the input side. The outward tapering allows a relaxed design for the interface between the MZI and MMI. In FIG. 10, the MMI 44 is both tapered and angled. Different configurations of multi-mode sections with comparable perfonnances, for example, butterfly and angled MMI's, are described by Besse et al. in "New 1×2 multimode interference couplers with free selection of power splitting ratios," ECOC 94 and by Besse in Swiss Patent Application No. 03 310/93-3, 4. November 1993. Similar multi-mode sections are also shown in FIGS. 2B to 2H of U.S. Pat. No. 5,889,906 to Chen et al. where multi-mode sections are used for different purposes.

Figure 11:
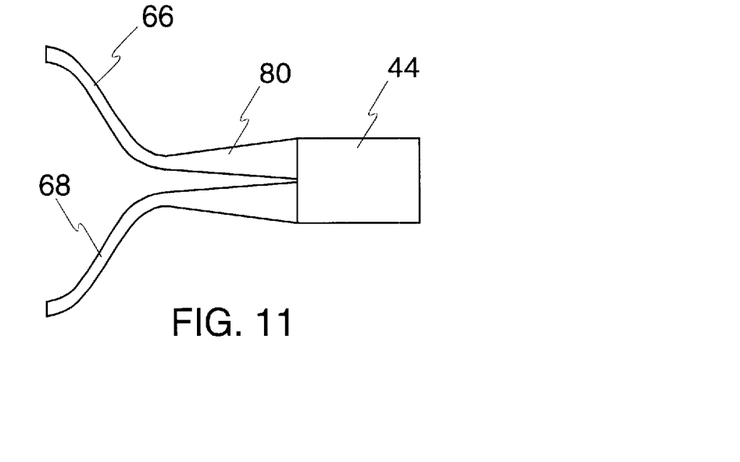

In FIG. 11, taper sections 80 couple the MZI waveguides 66,68 to the MMI 44. The taper sections 80 taper from single mode on the MZI side to double mode on the MMI side. This allows a more efficient coupling of the single-mode field distribution from the MZI branches into the MMI.

Figure 12:
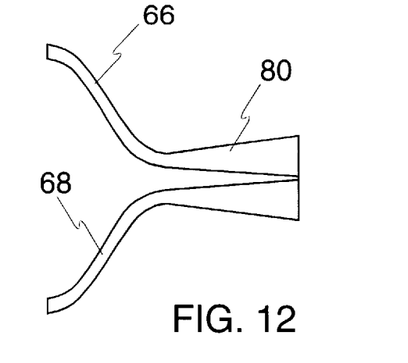

In FIG. 12, the taper sections 80 couple directly into the first free space region 48 of FIG. 3. Each tapered section itself acts as the required multi-mode section.

Figure 13:
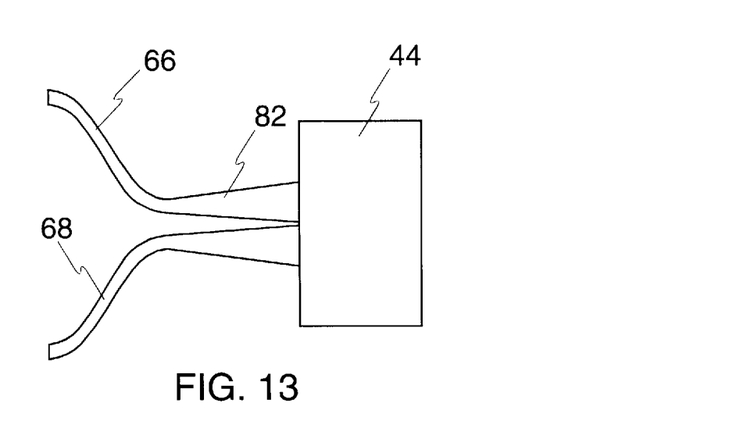

The embodiment of FIG. 13 is close to that of FIGS. 2 and 3 except that the waveguides 66, 68 have slightly tapered sections 82 that are adiabatically changed in width at the entrance of the MMI section 44.

The invention thus provides a flattened passband in a phasar, thus enabling a multi-wavelength communication system to be more tolerant of wavelength drift and other forms of miscalibration between different nodes in a network. The flattening is obtained by a slight increase in the complexity of the waveguide structure of the phasar, without the need for additional materials or controls.

What is claimed is:

1. A passband-flattened phasar, comprising a phasar comprising two free space regions coupled by a plurality of arrayed waveguides and having at least one optical waveguide disposed on an output side of a first one of the free space regions and a plurality of optical waveguides disposed on an output side of a second one of the free space regions, there being disposed between one of the optical waveguides and one of the free space regions a structure comprising:
    a Mach-Zehnder interferometer coupled to said one waveguide on one side and having two ports on a second side thereof; and
    a multi-mode waveguide supporting more than one laterally defined mode and having a first end coupled to said the two ports of the Mach-Zehnder interferometer at least two positions with a separation therebetween and a second end coupled to said one free space region.

2. The phasar of claim 1, wherein said separation provides a lateral dispersion of said multi-mode waveguide substantially equal to a lateral dispersion of said two free space regions and said arrayed waveguides.

3. The phasar of claim 1, wherein said multi-mode waveguide has a length approximately equal to a multiple plus a half of a beat length between a fundamental mode and a next higher mode supported by said multi-mode waveguide.

4. The phasar of claim 3, wherein said separation provides a lateral dispersion of said multi-mode waveguide substantially equal to a lateral dispersion of said two free space regions and said arrayed waveguides.

5. The phasar of claim 1, wherein said Mach-Zehnder interferometer comprises an optical coupler coupling an optical signal on a single-port side to two optical signals on a two-port side.

6. The phasar of claim 5, wherein said optical coupler is a Y-coupler.

7. The phasar of claim 1, wherein said Mach-Zehnder interferometer comprises two single-mode waveguides having different optical lengths.

8. The phasar of claim 7, wherein respective tapered waveguides have first single-mode ends connected to respective ones of said single-mode waveguides of said Mach-Zehnder interferometer and second multi-mode ends coupled to said multimode waveguide.

9. The phasar of claim 7, further comprising at least one electrically controlled means for varying a refractive index associated with said single-mode waveguides of said Mach-Zehnder interferometer.

10. The passband-flattened phasar of claim 1, wherein no cross coupler couples optical signals of said two ports to 3 dB or more between said Mach-Zehnder interferometer and said multi-mode waveguide.

11. The phasar of claim 1, wherein said phasar is incorporated into a wavelength-division multiplexing (WDM) system for transmitting a plurality of WDM wavelengths in a comb of wavelengths separated by a channel spacing and wherein said Mach-Zeluider interferometer has a spectral free range approximately equal to said channel spacing.

12. A phasar, comprising:
    a first input channel being single mode within a band of transmission wavelengths;
    an optical splitter having an input port coupled to said first fiber and having two output ports receiving approximately equal energies of a signal received on said input port;
    a first and a second waveguide coupled to said two output ports and having optical lengths differing by a selected optical length difference;
    a multi-mode waveguide being multi-moded across said band of transmission wavelengths, having a input side coupled to said first and second waveguides with a lateral separation therebetween and having a length approximately equal to a multiple plus one-half of a beat length of said band of transmission wavelengths, and having an output side;
    a first free space region coupled on a first side thereof to said output side of said multi-mode waveguide;
    an array of waveguides coupled to a second side of said first free space regions having predetermined differences of lengths thereof;

a second free space region coupled on a first side thereof to said array of waveguides; and at least one output waveguide coupled to a second side of said second free space region.

13. A phasar, comprising:

a first input channel being single mode within a band of transmission wavelengths;

an optical splitter having a input port coupled to said first fiber and having two output ports receiving approximately equal energies of a signal received on said input port;

a first and a second waveguide coupled to said two output ports and having optical lengths differing by a predetermined optical length difference;

a multi-mode waveguide being multi-moded across said band of transmission wavelengths, having a input side coupled to said first and second waveguides with a lateral separation therebetween;

a first free space region coupled on a first side thereof to said output side of said multi-mode waveguide;

an array of waveguides coupled to a second side of said first free space regions having predetermined differences of lengths thereof;

a second free space region coupled on a first side thereof to said array of waveguides; and at least one output waveguide coupled to a second side of said second free space region;

wherein said separation produces a lateral dispersion within said multi-mode waveguide adjacent to said first free space region substantially equal to a lateral dispersion produced by said first and second free space regions and said arrayed waveguide.

14. The passband-flattened phasar of claim 13, wherein said multi-mode waveguide has a length approximately equal to a multiple plus one-half of a beat length of said band of transmission wavelengths, and having an output side.

15. A wavelength-division multiplexing (WDM) communication system comprising multiple single-mode optical channels carrying a multiplicity of optical signals having respective optical carrier wavelengths, said system including a wavelength routing phasar comprising;

a first free space region;

a second free space region;

a plurality of arrayed optical waveguides coupled to first sides of said first and second free space regions having optical lengths having predetermined optical length differences therebetween;

a Mach-Zehnder interferometer having an optical splitter including a port on one side thereof connected to one of said single-mode optical channels and two ports on a second side thereof; and a multi-mode waveguide, which is multi-mode at all of said optical carrier wavelengths, coupled on a first longitudinal end to said two ports from said Mach-Zehnder interferometer and coupled on a second longitudinal end to one of said first and second free space regions.

16. The communication system of claim 15, wherein said optical carrier wavelengths are arranged in a WDM comb with neighboring wavelengths separated by a wavelength channel separation and wherein said Mach-Zehnder interferometer has a free spectral range substantially equal to said wavelength channel separation.

17. The communication system of claim 15, wherein a spatial lateral optical dispersion of said multi-mode waveguide at an interface with said one free space region substantially equals a spatial lateral optical dispersion of said first and second free space regions and said arrayed waveguides adjacent to said multi-mode waveguide.

18. The communication system of claim 17, wherein said optical carrier wavelengths are arranged in a WDM comb with neighboring wavelengths separated by a wavelength channel separation and wherein said Mach-Zehnder interferometer has a free spectral range substantially equal to said wavelength channel separation.

19. The communication system of claim 15, wherein said single-mode optical channels comprise optical fibers and further comprising a plurality of communication nodes interconnected by said optical fibers.

* * * * *

UNITED STATES PATENT AND TRADEMARK OFFICE
CERTIFICATE OF CORRECTION

PATENT NO. : 6,289,147 B1
DATED : September 11, 2001
INVENTOR(S) : Bulthuis et al.

It is certified that error appears in the above-identified patent and that said Letters Patent is hereby corrected as shown below:

<u>Column 10,</u>
Line 3, delete "the" (first occurrence); before "at" insert -- at --.

Signed and Sealed this

Seventh Day of May, 2002

*Attest:*

*Attesting Officer*

JAMES E. ROGAN
*Director of the United States Patent and Trademark Office*